(12) United States Patent
Guettge et al.

(10) Patent No.: US 12,547,153 B2
(45) Date of Patent: Feb. 10, 2026

(54) METHOD, CONTROL UNIT, MEASUREMENT SYSTEM, COMPUTER PROGRAM PRODUCT

(71) Applicant: ROHDE & SCHWARZ GMBH & CO. KG, Munich (DE)

(72) Inventors: Fabian Guettge, Unterhaching (DE); Bjoern Schmid, Munich (DE); Thomas Braunstorfinger, Munich (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 437 days.

(21) Appl. No.: 18/170,365

(22) Filed: Feb. 16, 2023

(65) Prior Publication Data

US 2024/0280963 A1  Aug. 22, 2024

(51) Int. Cl.
*G05B 19/4155*  (2006.01)

(52) U.S. Cl.
CPC .............. *G05B 19/4155* (2013.01); *G05B 2219/34242* (2013.01)

(58) Field of Classification Search
None
See application file for complete search history.

(56) References Cited

U.S. PATENT DOCUMENTS

| | | | | |
|---|---|---|---|---|
| 5,349,660 A | * | 9/1994 | Sutula | G01R 31/31903 702/123 |
| 6,697,754 B1 | * | 2/2004 | Alexander | G01R 13/22 702/123 |
| 6,862,708 B1 | * | 3/2005 | Higginbotham | G06F 9/45508 709/200 |
| 2011/0264244 A1 | * | 10/2011 | Pettigrew | H04L 12/403 700/89 |
| 2014/0062679 A1 | * | 3/2014 | Markov | G08C 17/02 340/12.22 |
| 2015/0078425 A1 | | 3/2015 | Bremer et al. | |

FOREIGN PATENT DOCUMENTS

| | | | | |
|---|---|---|---|---|
| CN | 107885675 B | | 12/2019 | |
| CN | 111741019 A | * | 10/2020 | ............. H04L 69/22 |
| EP | 0552895 B1 | | 12/1998 | |
| WO | WO-2022088742 A1 | * | 5/2022 | ............. H04L 43/08 |

* cited by examiner

*Primary Examiner* — David Earl Ogg
(74) *Attorney, Agent, or Firm* — BROOKS KUSHMAN P.C.

(57) ABSTRACT

The present disclosure provides a method for accelerating remote control of a measurement application device, the method comprising receiving a control command for the measurement application device, the control command being received in a text-based format that uses a predetermined character encoding for encoding the command text, mapping the received control command to a command identifier, and transmitting the command identifier to the measurement application device.

22 Claims, 8 Drawing Sheets

METHOD, CONTROL UNIT, MEASUREMENT SYSTEM, COMPUTER PROGRAM PRODUCT

TECHNICAL FIELD

The disclosure relates to a method for accelerating remote control of a measurement application device. Further, the present disclosure relates to a control unit for a measurement system, a measurement system, and a computer program product.

BACKGROUND

Although applicable to any type of measurement systems, the present disclosure will mainly be described in conjunction with remote controlling measurement application devices in a measurement system.

In the development, production and maintenance of electronic devices, a plurality of measurements usually needs to be performed. Such measurements are usually not performed manually, but automatically.

For complex measurement tasks, measurement programs may be programmed with a respective scripting language, like the SCPI language, also called "Standard Commands for Programmable Instruments". Such scripting languages comprise a human-readable format and parsing the string-represented commands requires a large amount of processing resources in the receiving measurement application devices.

Accordingly, there is a need for reducing the amount of required processing resources in measurement systems.

SUMMARY

The above stated problem is solved by the features of the independent claims. It is understood, that independent claims of a claim category may be formed in analogy to the dependent claims of another claim category.

Accordingly, it is provided:

A method for accelerating remote control of a measurement application device, the method comprising receiving a control command for the measurement application device, the control command being received in a text-based format that uses a predetermined character encoding for encoding the command text, mapping the received control command to a command identifier, and transmitting the command identifier to the measurement application device.

Further, it is provided:

A control unit comprising a processor configured to perform a method according to the present disclosure.

Further, it is provided:

A measurement system comprising a control unit according to the present disclosure, and at least one measurement application device, wherein the control unit is communicatively coupled to the at least one measurement application device.

Further, it is provided:

A computer program product comprising computer readable instructions that when executed by a processor cause the processor to perform a method according to the present disclosure.

The present disclosure is based on the finding that using text-based formats for control commands in measurement systems, while providing user-readable commands, produces an overhead in the data transmission and when parsing the single control commands in the receiver.

In modern measurement systems, a protocol like the Standard Commands for Programmable Instruments or SCPI protocol may be used to control measurement application devices remotely or automatically in the measurement system. The control commands according to the SCPI protocol may be strings with many characters. Some SCPI control commands may have more than 100 characters. Further, in modern measurement systems many thousands of control commands may be available.

In order to process such control commands in a measurement application device, a complex parser is required. Parsing the received control commands, therefore, consumes much processing power and requires an important amount of time.

In order to optimize the control of measurement application devices in measurement systems, the present disclosure provides a method, a respective control unit, a respective measurement system, and a respective computer program product, especially a non-transitory computer program product.

According to the present disclosure, a control command for a measurement application device is received. The term "receiving" in this context may refer to the control command being provided from any source for controlling the respective measurement application device. The control commands may e.g., be provided by a user manually. This may happen, for example, when a user is creating a program for controlling a measurement system. A user may, for example, use a computer with a respective program or code editor to manually generate a respective program or program file. Such a program or code editor may provide the user with the ability to transmit single control commands to the measurement system, or to specific measurement application devices. Such a program or code editor may also provide the user with the ability to run a prepared program file. Prepared program files may also be stored in respective databases, local or remote to the measurement system, and may later be loaded from the database for execution of the program file in a measurement system. Of course, any other source, like a network storage, a cloud server or the like, may provide the control commands.

The control commands are received in a text-based format that uses a predetermined character encoding, like the ASCII based SCPI or Standard Commands for Programmable Instruments protocol. It is understood, that the SCPI protocol is just an exemplary protocol, and that any other adequate text-based protocol may be used in combination with the solution of the present disclosure.

The received text-based control commands may be human-readable and may, therefore, easily be assessed by a user of the measurement system. Further, in legacy systems, program files or programs using e.g., the SCPI protocol, may already be readily available. Fully replacing such available program files or programs would suppose a huge effort in recreating the program files or programs.

Therefore, according to the present disclosure, each one of the received control commands is mapped to a respective command identifier, and the respective command identifier is transmitted to the measurement application device instead of the control command. It is understood, that the command identifiers allow to uniquely identify the respective control command. The command identifiers may, therefore, be implemented as unique command identifiers.

As indicated above, thousands of control commands may be available in modern measurement systems, and each control command may comprise up to hundreds of characters.

In order to represent thousands of control commands, a number as large as the number of possible control commands is required. Even if such a number is represented as character-encoded number, for example as ASCII encoded number, five characters would be sufficient to provide command identifiers for up to 99999 different control commands. In this example, every single control command could, therefore, be transmitted as a character string of a maximum of 5 characters. In embodiments, preceding zeros, 0, may be removed. The command identifier "00005" may, therefore, be transmitted as "5".

On one hand, especially with large programs that comprise many control commands, this would reduce the bandwidth required to transmit the program to a measurement application device by an important amount. On the other hand, parsing the command identifier at the receiving measurement application device is less complex than parsing a character string that is hundreds of characters long.

The measurement system according to the present disclosure may comprise any number of control units and any number of measurement application devices, starting from one, wherein complex measurement systems may comprise many more. The control unit and the measurement application devices may be communicatively coupled to each other via a respective communication interface.

It is understood, that the communication interface may comprise any kind of wired and wireless communication interfaces, like for example a network communication interface, especially an Ethernet, wireless LAN or WIFI interface, a USB interface, a Bluetooth interface, an NFC interface, a visible or non-visible light-based interface, especially an infrared interface.

It is further understood, that the control unit and the measurement application devices may communicate via an intermediary network with each other, and that such a network may comprise any type of network devices, like switches, hubs, routers, firewalls, and different types of network technologies.

In embodiments, the measurement system may comprise a single dedicated control unit. In other embodiments, a dedicated control unit may be replaced by or may be supported by further control units, that may be dedicated devices or that may be integrated into any one of the measurement application devices.

A measurement application device may comprise any device that may be used in a measurement application to acquire an input signal or to generate an output signal, or to perform additional or supporting functions in a measurement setup. Such a measurement application device may comprise, for example, a signal acquisition device e.g., an oscilloscope, especially a digital oscilloscope, or a vector network analyzer. Such a measurement application device may also comprise a signal generation device e.g., a signal generator, especially an arbitrary signal generator or a vector signal generator. Further possible measurement application devices comprise devices like calibration standards, or measurement probe tips. Of course, at least some of the possible functions, like signal acquisition and signal generation, may be combined in a single measurement application device.

In embodiments, the measurement application device may also comprise pure data acquisition devices that are capable of acquiring an input signal and provide the acquired input signal as digital input signal to a respective data storage or application server. Such pure data acquisition devices not necessarily comprise a user interface or display. Instead, such pure data acquisition devices may be controlled remotely e.g., via a respective data interface, like a network interface or a USB interface. The same applies to pure signal generation devices that may generate an output signal without comprising any user interface or configuration input elements. Instead, such signal generation devices may be operated remotely via a data connection.

In the control unit a processor may be provided for performing a method according to the present disclosure. The processor may e.g., execute computer-readable instructions as may be stored on a non-transitory computer readable medium or program product according to the present disclosure.

The processor may be provided as at least one of a dedicated processing element e.g., a processing unit, a microcontroller, a field programmable gate array, FPGA, a complex programmable logic device, CPLD, an application specific integrated circuit, ASIC, or the like. The processor may at least in part also be provided as a computer program product comprising computer readable instructions that may be executed by a processing element. In a further embodiment, the processor may be provided as addition or additional function or method to the firmware or operating system of a processing element that is already present in the respective application as respective computer readable instructions. Such computer readable instructions may be stored in a memory that is coupled to or integrated into the processing element. The processing element may load the computer readable instructions from the memory and execute them.

In addition, it is understood, that any required supporting or additional hardware may be provided like e.g., a power supply circuitry and clock generation circuitry.

With the solution according to the present disclosure, the control of measurement application devices in a measurement system may, consequently, be improved and the efficiency of the control of the measurement application devices may be increased.

Further embodiments of the present disclosure are subject of the further dependent claims and of the following description, referring to the drawings.

In the following, the dependent claims referring directly or indirectly to claim 1 are described in more detail. For the avoidance of doubt, the features of the dependent claims relating to the method can be combined in all variations with each other and the disclosure of the description is not limited to the claim dependencies as specified in the claim set. Further, the features of the other independent claims may be combined with any of the features of the dependent claims relating to the method in all variations, wherein respective apparatus elements may perform the respective method steps.

In an embodiment, which can be combined with all other embodiments of the method mentioned above or below, the control command may comprise a header and at least one parameter, and when transmitting the command identifier, the header may be replaced by the command identifier, and the command identifier may be transmitted together with the at least one parameter.

In modern measurement systems, it may be required not only to provide control commands to measurement application devices, but also to provide parameters to the measurement application devices together with the control commands.

In order to leverage the optimization provided by mapping the control commands to command identifiers, and further provide parameters to the measurement application devices, control commands comprising parameters may be split in a header and a parameter section.

The header may represent a pure control command without any parameters. The parameter section may comprise the parameters that where originally provided with the control command.

It is understood, that the original control command may be provided with a header and a parameter section after the header. Separating may be simply performed by dividing the original text-representation or string in two at the respective position.

In embodiments, the parameters may be distributed throughout the original control command, and may be embedded in the string that represents the original control command. In such embodiments, the parameter section may be extracted by removing the sections of the original control command that represent single parameters and grouping the extracted parameters as parameters to be transmitted. The remaining control command without the extracted parameters represents the header.

The header may then be mapped as indicated above to a respective command identifier. After mapping the control command, the command identifier may be transmitted with the parameters to the respective measurement application device.

In another embodiment, which can be combined with all other embodiments of the method mentioned above or below, mapping may comprise querying a look-up table that comprises a unique command identifier for each one of all possible control commands.

As indicated above, thousands of possible control commands may be present in a measurement system. Mapping of these control commands may easily be performed using a look-up table.

Such a look-up table may comprise an entry for every possible control command, the entry comprising the respective control command as searchable value, and the respective command identifier.

In a further embodiment, which can be combined with all other embodiments of the method mentioned above or below, mapping may comprise calculating the command identifier based on a mathematical method, especially based on a hashing algorithm.

As alternative to providing a look-up table, the command identifiers may also be calculated based on a respective mathematical method. Such a method may, for example, comprise a hashing algorithm that provides a unique hash for each control command.

Of course, the above-mentioned look-up table and hashing algorithm may be provided on the mapping or sending side that sends the control commands, and on the receiving side that receives the control commands e.g., the measurement application devices.

In another embodiment, which can be combined with all other embodiments of the method mentioned above or below, the command identifier may comprise a numerical identifier, wherein transmitting may comprise one of transmitting the command identifier as character encoded numerical identifier that is encoded with the same character encoding as the command text, or transmitting the command identifier as binary encoded command identifier.

As indicated above, each one of the command identifiers may be encoded as numerical identifier. Above an example with single numbers ranging from 0 to 9 was given i.e., a decimal number system command identifier. It is understood, that other number systems may also be used that may be represented as strings. For example, a hexadecimal representation may also be used for the command identifiers using characters ranging from 0 to 9, and A to F.

Independently of the used number system, when transmitting the command identifiers to the receiving measurement application device, the respective command identifiers may be transmitted as strings or character-based numbers, for example, using the ASCII format.

Using strings or character-based numbers allows reusing the parsers already present in the receiving measurement application devices, while at the same time, the number of characters that must be transmitted and parsed is significantly reduced.

As alternative, the command identifier may be transmitted as binary number to the receiving measurement application device. Using binary numbers will further reduce the required bandwidth. While a number up to 99999 will require 5 bytes in ASCII code, the same number may be transmitted in a two-byte binary value. Further, no parsing will be required at the receiving measurement application device, since the received number may directly be used e.g., to look-up the respective control command in a look-up table.

In a further embodiment, which can be combined with all other embodiments of the method mentioned above or below, the at least one parameter may be transmitted as character encoded parameter that is encoded with the same character encoding as the command text, or as binary encoded parameter.

As indicated above, control commands may be provided as such or with respective parameters. The parameters may, as the control commands, also be transmitted as character encoded string e.g., as ASCII string. The parameters in such an embodiment may be parsed by the functionality already present in the receiving measurement application device, but without any efficiency improvement in the transmission.

If the receiving measurement application device is enabled to process parameters in binary format, the parameters may be transmitted more efficiently as binary numbers.

In another embodiment, which can be combined with all other embodiments of the method mentioned above or below, transmitting may comprise transmitting a first information token to the measurement application device together with the command identifier, or prior to transmitting the command identifier, wherein the first information token may indicate that the following control command is being transmitted as command identifier.

The first information token may be used to indicated for a single control command that is transmitted following the first information token that the following control command is represented by the respective command identifier.

In a measurement system, the control commands may, for example, be transmitted in a mixed mode, some control commands via the respective command identifier, and some control commands as the original control command.

In such embodiments, the first information token allows marking the control command that are provided as command identifiers for the receiver.

In embodiments, the command identifier may be transmitted as individual control command to the receiving measurement application device. Of course, for this control command, no command identifier will be used. The receiving measurement application device will then know, that the next control command will be transmitted as command identifier.

In embodiments, the first information token may be provided as addition, especially prefix, to the data package that is sent to the receiving measurement application device. Such a data package may then comprise the first information token, the command identifier, and if present, the respective parameters.

The first information token may comprise a single special character, for example, a character that is not used in control commands, or that is defined to be a special character also in control commands. In addition, or alternatively, the first information token may comprise a string or multiple characters.

In a further embodiment, which can be combined with all other embodiments of the method mentioned above or below, transmitting may comprise transmitting a second information token to the measurement application device prior to transmitting the command identifier, wherein the second information token may indicate that all following control commands are being transmitted as command identifiers.

In contrast to the first information token that marks only a single control command, the second information token may be used to indicate to a receiving measurement application device that all following control commands will be transmitted by the respective command identifier.

The second information token may be seen as an operation mode switching command.

In another embodiment, which can be combined with all other embodiments of the method mentioned above or below, transmitting may comprise transmitting a third information token to the measurement application device, the third information token indicating that the following control command is not transmitted as command identifier but as full control command, and transmitting the received control command to the measurement application device instead of the command identifier.

With the help of the third information token, the receiving measurement application device may be switched back to the standard operation mode, that transmits the full text-based control commands to the measurement application devices.

As with the first information token, and the second information token, the third information token may be used to mark a single control command, or the following control command. Alternatively, the third information token may be used to permanently switch the receiving measurement application device back into the original receiving mode.

In a further embodiment, which can be combined with all other embodiments of the method mentioned above or below, for performing the mapping, all possible command identifiers may be pre-calculated based on a list of possible control commands.

The set of possible control commands, and therefore the possible command identifiers, may be the full set as defined in a respective standard, or as available for a given measurement application device, or as defined for all possible measurement application devices of a measurement system.

Alternatively, the set of possible control commands and the respective command identifiers, may be identified by parsing a program file or program comprising control commands for the measurement system. The amount of possible command identifiers may be reduced if only the required, identified command identifiers are pre-calculated.

It is understood, that the pre-calculated command identifiers may then be stored on the sender side e.g., the control unit, and on the receiver side e.g., the measurement application devices.

The above presented explanations mostly referred to the sending side in the measurement system that sends the control commands to the measurement application devices. Below, the receiving side will also be described.

In another embodiment, which can be combined with all other embodiments of the method mentioned above or below, the method may further comprise receiving the command identifier in the measurement application device, reverse-mapping the command identifier to the respective control command in the measurement application device, and executing the control command in the measurement application device.

With this embodiment, the receiving side e.g., a measurement application device, is enabled to process control commands that are transmitted via their respective command identifiers.

The reverse-mapping allows the measurement application device to identify the respective control command or function that is to be executed in the measurement application device.

In a further embodiment, which can be combined with all other embodiments of the method mentioned above or below, reverse-mapping may comprise querying a look-up table that comprises a callback function for each one of all possible command identifiers, and executing may comprises executing the respective callback function for the command identifier.

If a look-up table is used, this look-up table may in embodiments comprise the original control command. Such a control command may then be parsed by a parser in the measurement application device, as if the original control command was transmitted. Such an embodiment reduces the bandwidth in a communication network of the measurement system.

In embodiments, the look-up table may, however, directly comprise callback functions or pointers to such functions, that are to be executed after receiving a command identifier.

With the callback function or the link to the callback function, no parsing is required and the respective callback function may directly be executed, thereby speeding up the execution of the control command in the receiving measurement application device.

BRIEF DESCRIPTION OF THE DRAWINGS

For a more complete understanding of the present disclosure and advantages thereof, reference is now made to the following description taken in conjunction with the accompanying drawings. The disclosure is explained in more detail below using exemplary embodiments which are specified in the schematic figures of the drawings, in which.

In the figures like reference signs denote like elements unless stated otherwise.

DETAILED DESCRIPTION OF THE DRAWINGS

For sake of clarity in the following description of the method-based FIGS. 1-5 the reference signs used above in the description of apparatus-based FIGS. 6-8 will be maintained.

Figure 1:
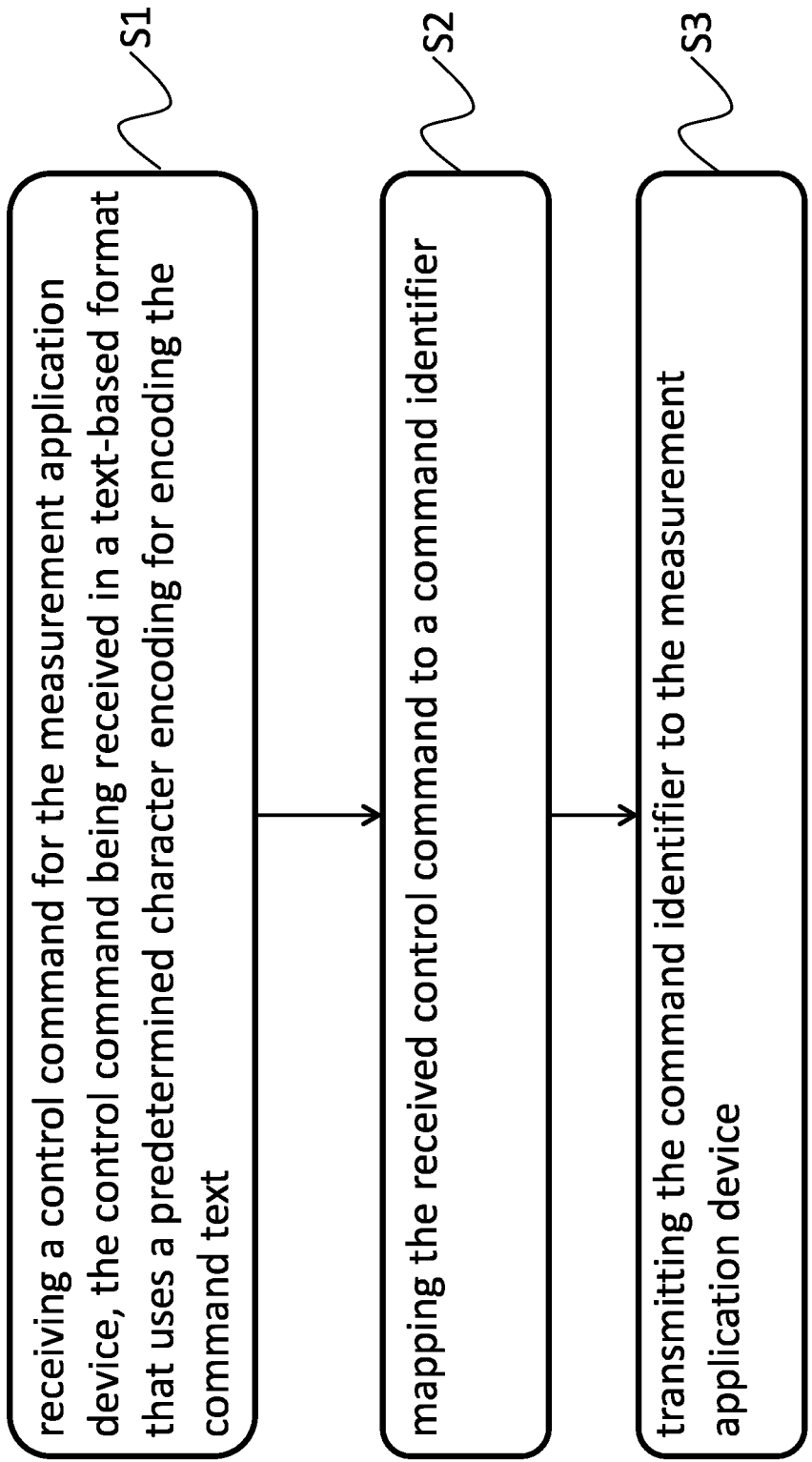
FIG. 1 shows a flow diagram of a method according to the present disclosure.

FIG. 1 shows a flow diagram of a method for accelerating remote control of a measurement application device 104, 204, OSC. The method comprises receiving S1 a control command 106 for the measurement application device 104, 204, OSC, the control command 106 being received in a text-based format that uses a predetermined character encoding for encoding the command text, mapping S2 the received control command 106 to a command identifier 107, and transmitting S3 the command identifier 107 to the measurement application device 104, 204, OSC.

The command identifier 107 may comprises a numerical identifier. When transmitting S3 the command identifier 107, the command identifier 107 may, in embodiments, be transmitted S3 as character encoded numerical identifier that is encoded with the same character encoding as the command text. Alternatively, the command identifier 107 may be transmitted as binary encoded command identifier 107.

Figure 2:
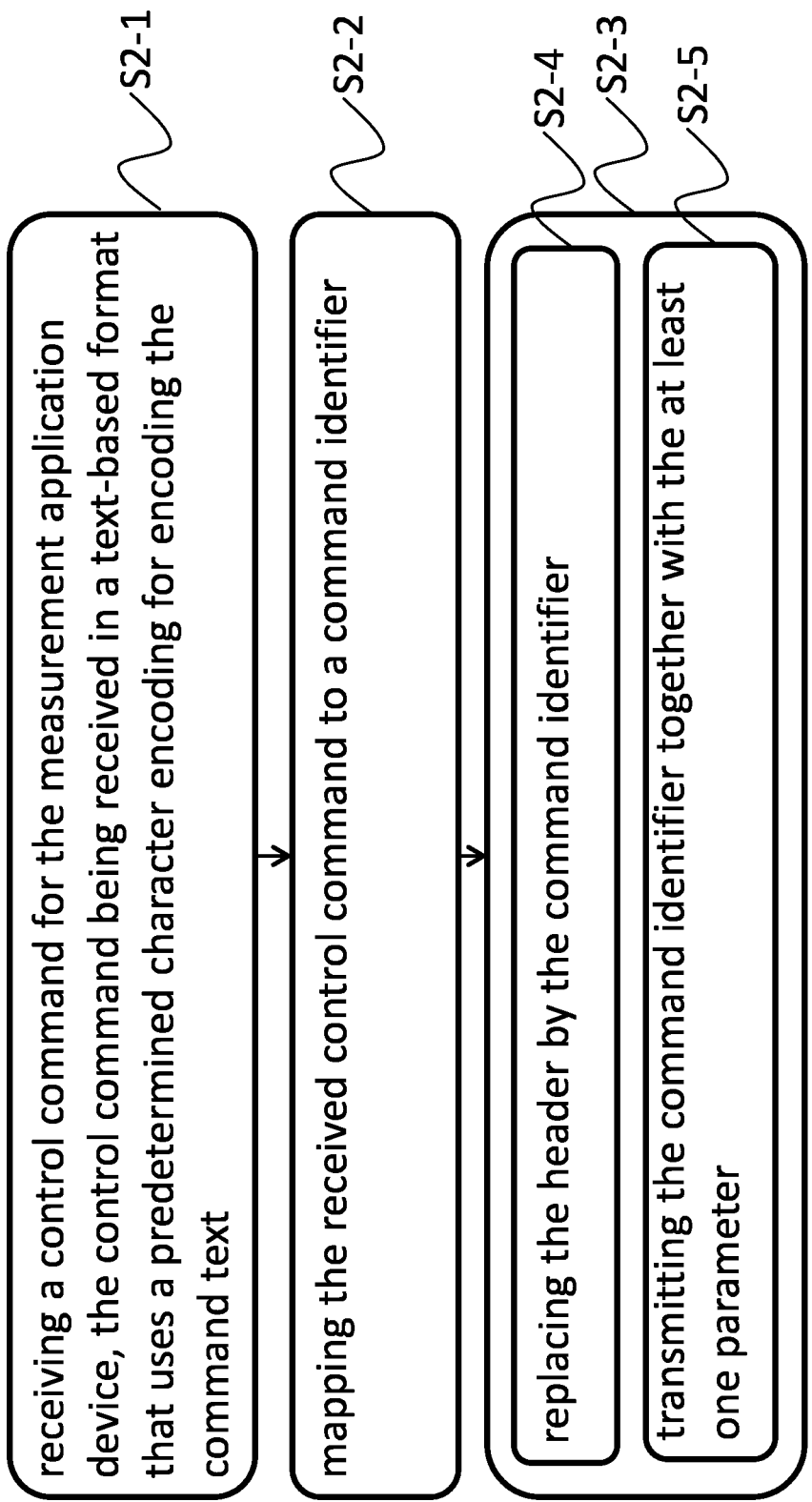
FIG. 2 shows another flow diagram of a method according to the present disclosure.

FIG. 2 shows another flow diagram of a method for accelerating remote control of a measurement application device 104, 204, OSC that is based on the method of FIG. 1. The method of FIG. 2, therefore, comprises receiving S2-1 a control command 106 for the measurement application device 104, 204, OSC, the control command 106 being received in a text-based format that uses a predetermined character encoding for encoding the command text, mapping S2-2 the received control command 106 to a command identifier 107, and transmitting S2-3 the command identifier 107 to the measurement application device 104, 204, OSC.

Further, the step of transmitting S2-3 comprises, for a control command 106 that comprises a header and at least one parameter, replacing S2-4 the header by the command identifier 107, and transmitting S2-5 the command identifier 107 together with the at least one parameter.

The at least one parameter may be transmitted as character encoded parameter that is encoded with the same character encoding as the control command 106, or as binary encoded parameter.

Figure 3:
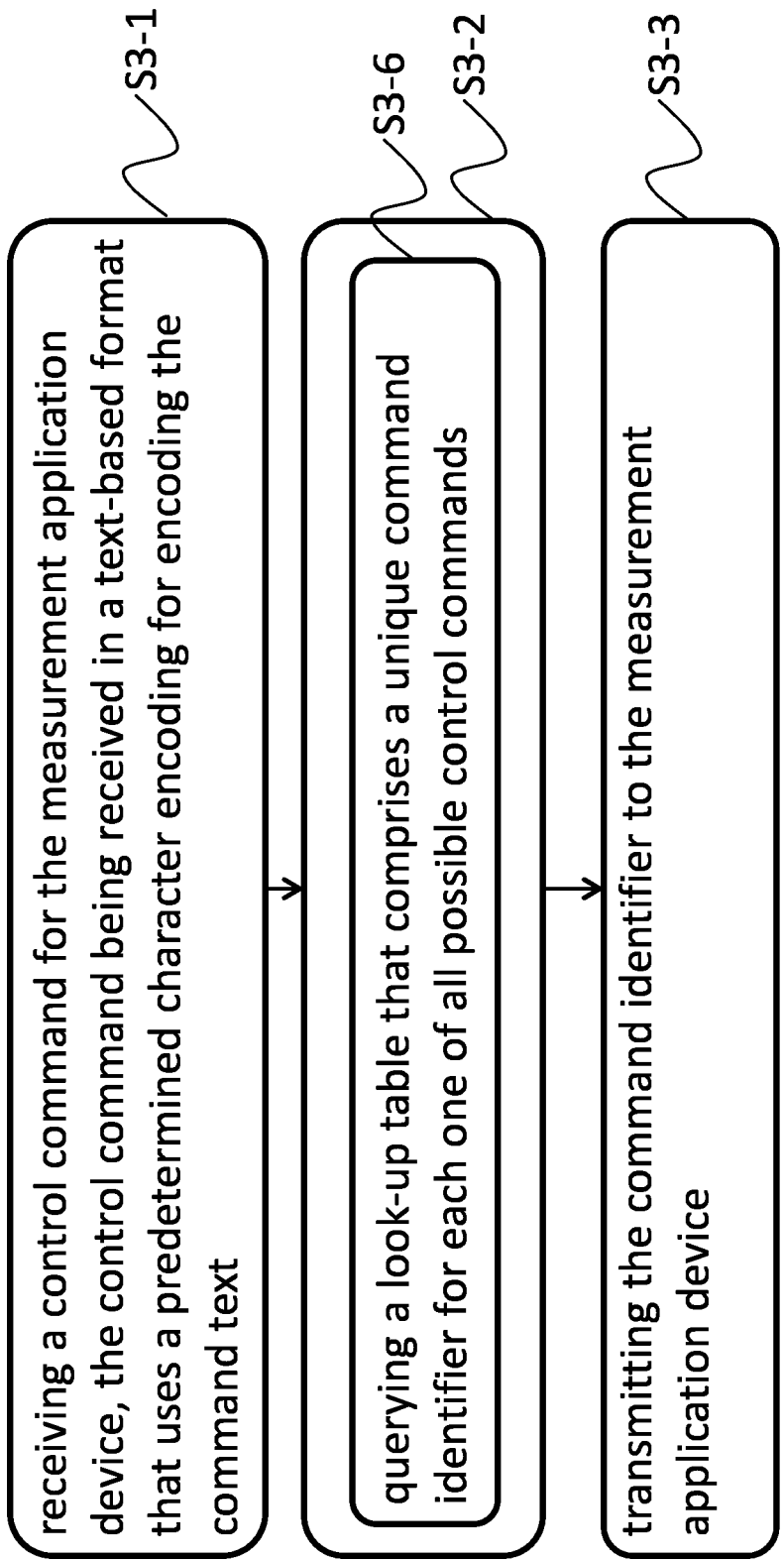
FIG. 3 shows a further flow diagram of a method according to the present disclosure.

FIG. 3 shows another flow diagram of a method for accelerating remote control of a measurement application device 104, 204, OSC that is based on the method of FIG. 1. The method of FIG. 3, therefore, comprises receiving S3-1 a control command 106 for the measurement application device 104, 204, OSC, the control command 106 being received in a text-based format that uses a predetermined character encoding for encoding the command text, mapping S3-2 the received control command 106 to a command identifier 107, and transmitting S3-3 the command identifier 107 to the measurement application device 104, 204, OSC.

Further, the step of mapping S3-2 comprises querying S3-6 a look-up table that comprises a unique command identifier 107 for each one of all possible control commands 106, to retrieve the command identifier 107.

Alternatively (not shown), mapping S3-2 may comprise calculating the command identifier 107 based on a mathematical method, especially based on a hashing algorithm. Mixing of a look-up table with algorithmically generated command identifiers 107 is also possible.

Figure 4:
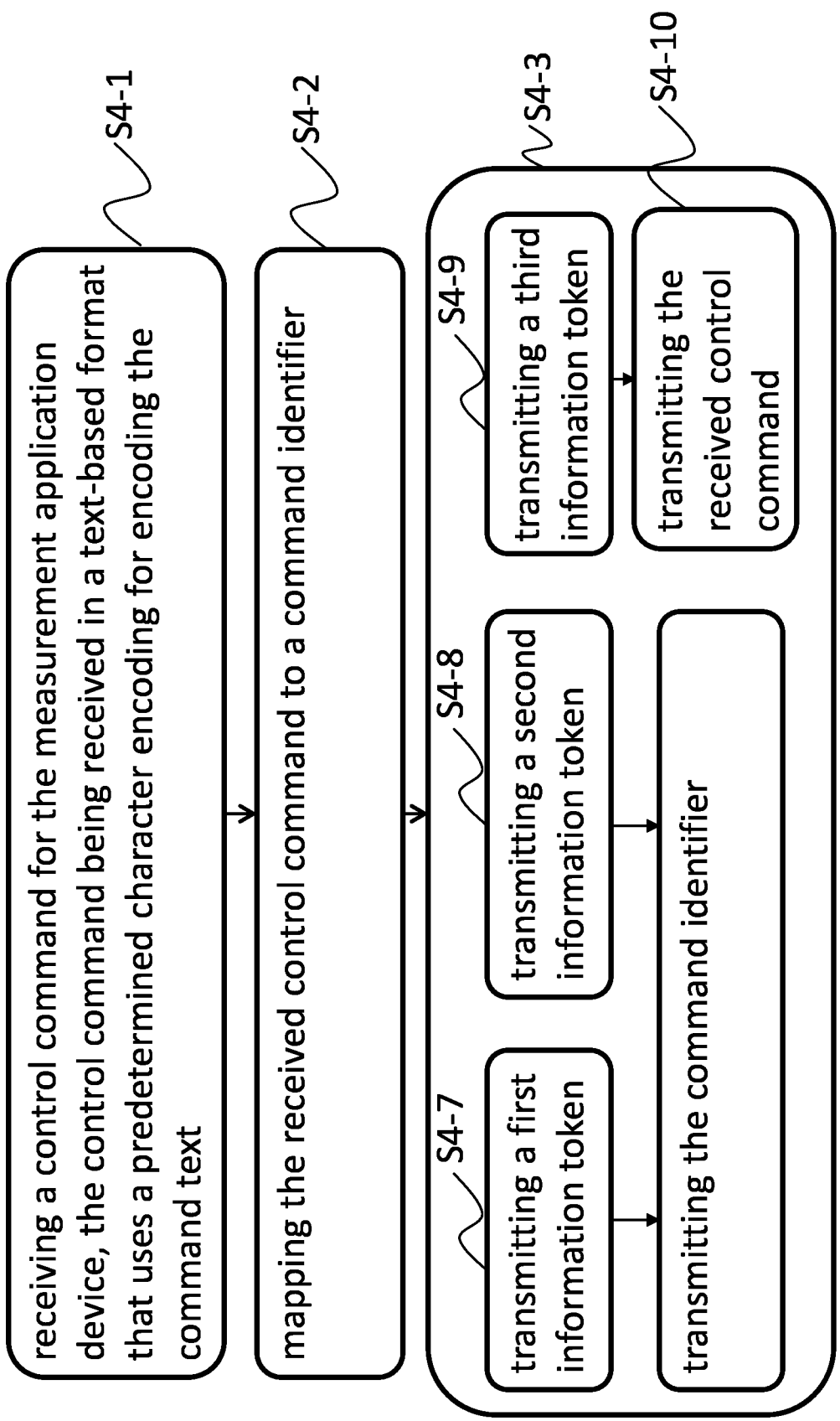
FIG. 4 shows a further flow diagram of a method according to the present disclosure.

FIG. 4 shows another flow diagram of a method for accelerating remote control of a measurement application device 104, 204, OSC that is based on the method of FIG. 1. The method of FIG. 4, therefore, comprises receiving S4-1 a control command 106 for the measurement application device 104, 204, OSC, the control command 106 being received in a text-based format that uses a predetermined character encoding for encoding the command text, mapping S4-2 the received control command 106 to a command identifier 107, and transmitting S4-3 the command identifier 107 to the measurement application device 104, 204, OSC.

Further, the step of transmitting S4-3 shows three parallel options that may be executed depending on the respective control command 106.

The first option comprises transmitting S4-7 a first information token to the measurement application device 104, 204, OSC together with the command identifier 107, or prior to transmitting the command identifier 107. This first information token indicates that the following control command 106 is being transmitted as command identifier 107.

The second option comprises transmitting S4-8 a second information token to the measurement application device 104, 204, OSC prior to transmitting the command identifier 107. This second information token indicates that all following control commands 106 are being transmitted as command identifiers 107.

The third option comprises transmitting S4-9 a third information token to the measurement application device 104, 204, OSC. This third information token indicates that the following control command 106 is not transmitted as command identifier 107 but as full control command 106. The third option further comprises transmitting S4-10 the received control command 106 to the measurement application device 104, 204, OSC instead of the command identifier 107.

Figure 5:
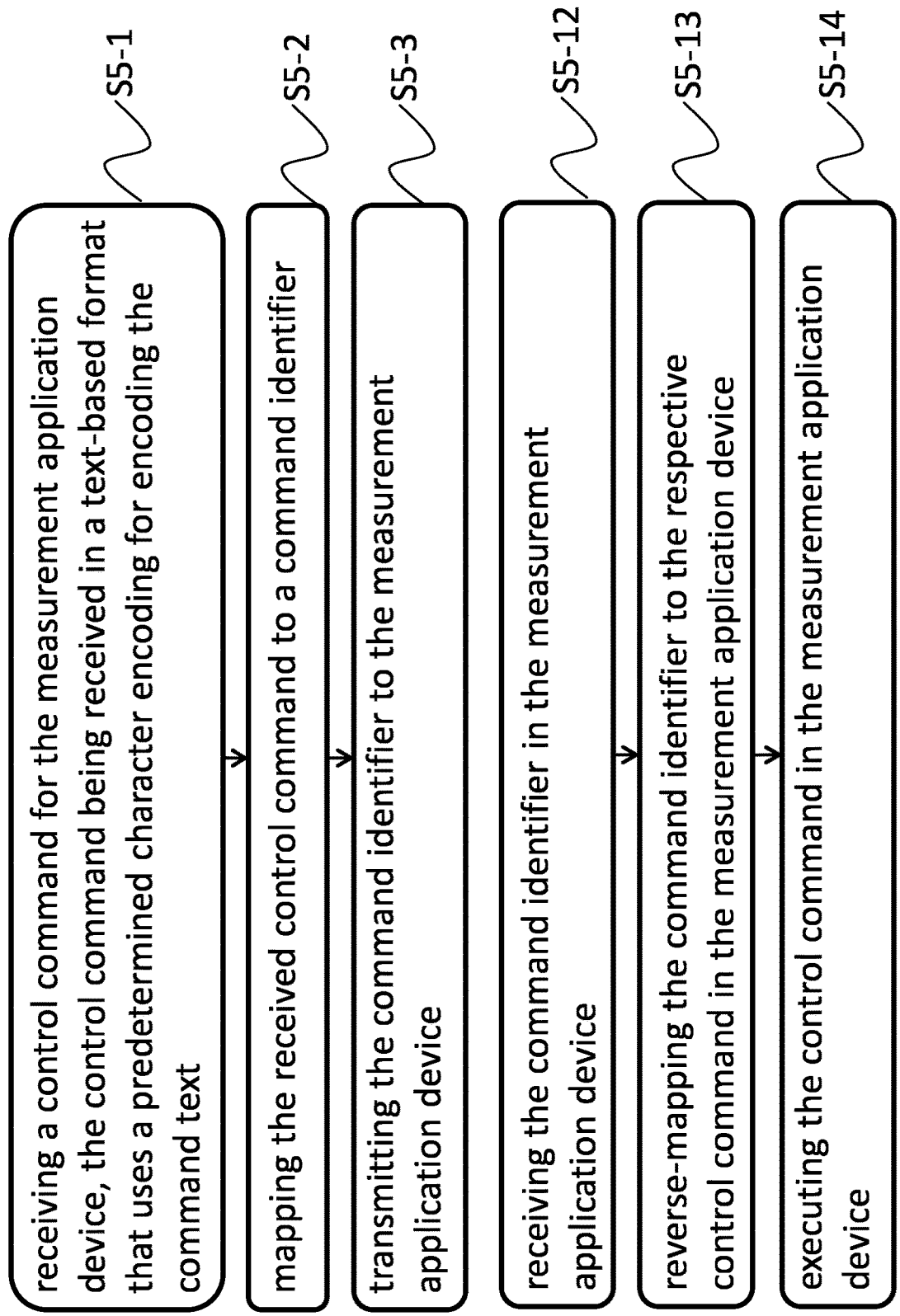
FIG. 5 shows a further flow diagram of a method according to the present disclosure.

FIG. 5 shows another flow diagram of a method for accelerating remote control of a measurement application device 104, 204, OSC that is based on the method of FIG. 1. The method of FIG. 5, therefore, comprises receiving S5-1 a control command 106 for the measurement application device 104, 204, OSC, the control command 106 being received in a text-based format that uses a predetermined character encoding for encoding the command text, mapping S5-2 the received control command 106 to a command identifier 107, and transmitting S5-3 the command identifier 107 to the measurement application device 104, 204, OSC.

The method of FIG. 5 further shows method steps that may be performed on the receiver sider i.e., in the measurement application device 104, 204, OSC.

These steps may comprise receiving S5-12 the command identifier 107 in the measurement application device 104, 204, OSC, reverse-mapping S5-13 the command identifier 107 to the respective control command 106 in the measurement application device 104, 204, OSC, and executing S5-14 the control command 106 in the measurement application device 104, 204, OSC.

Reverse-mapping may comprises querying a look-up table that comprises a callback function for each one of all possible command identifiers 107, wherein executing may comprise executing the respective callback function for the command identifier 107.

Figure 6:
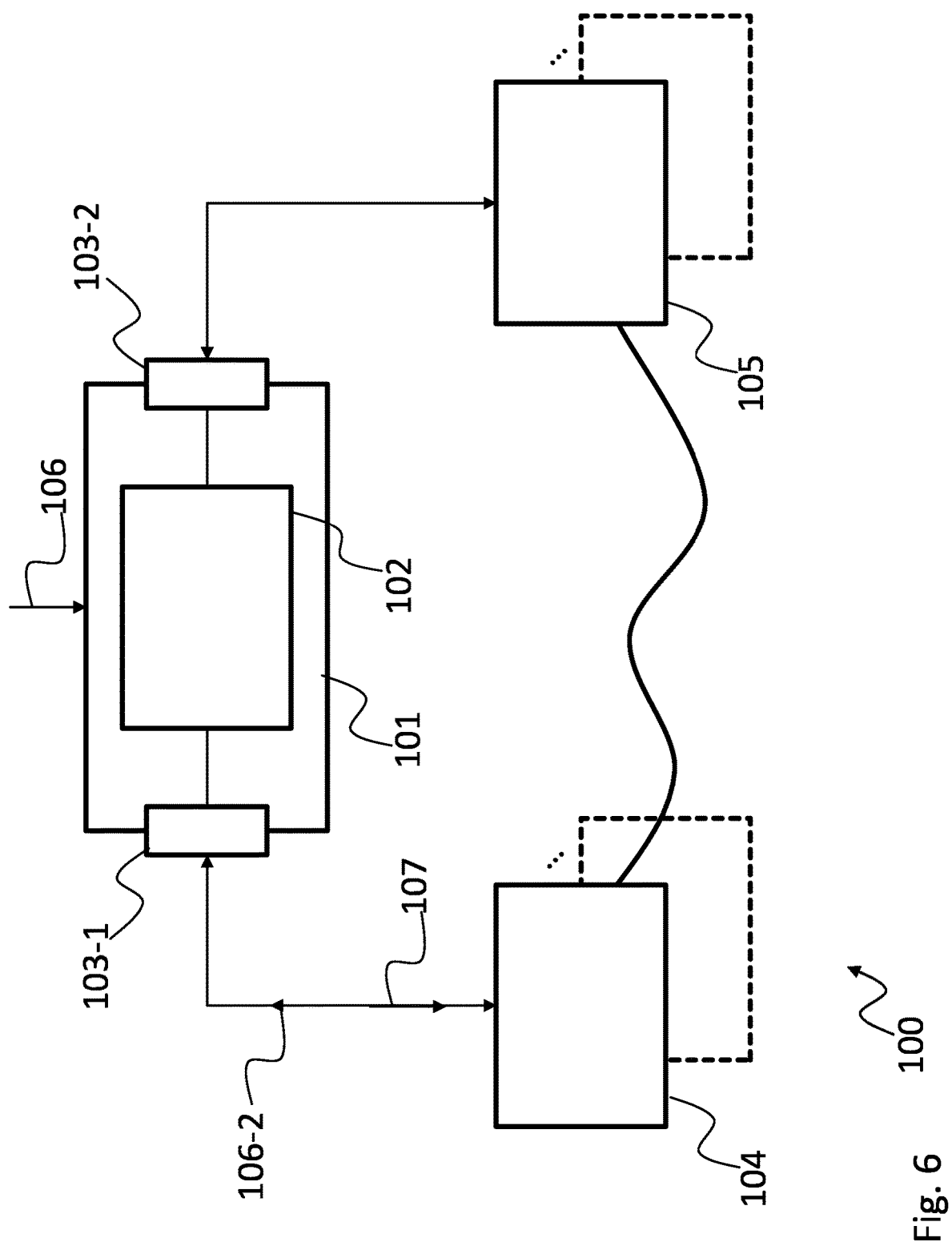
FIG. 6 shows a block diagram of a measurement system according to the present disclosure.

FIG. 6 shows a block diagram of a measurement system 100. The measurement system 100 comprises a control unit 101 with a processor 102 that is coupled to a first communication interface 103-1 and to a second communication interface 103-2. The first communication interface 103-1 is externally coupled to a measurement application device 104, wherein more measurement application devices are hinted at by a dashed box. The second communication interface 103-2 is externally coupled to a device under test 105, wherein more devices under test are hinted at by a dashed box. It is understood, that the connections between the elements of the measurement system 100 are just exemplary, and may be different in other embodiments. Further, the coupling between the device under test 105 and the control unit 101 is optional, however, if present, the device under test 105 may also be controlled via respective control commands 106. Further, in other embodiments, the control unit 101 may comprise a single communication interface.

In the measurement system 100, a control command 106 is received at the control unit 101. The processor 102 may be configured to implement any one of the embodiments of the method according to the present disclosure presented above or below. To this end, a memory, especially a non-transitory computer readable medium, with respective computer readable instructions that when executed by the processor 102 cause the processor 102 to perform the respective method.

The control unit 101 after processing the control command 106, transmits the respective command identifier 107 to the measurement application device 104.

It is understood, that the control unit 101, and especially the processor 102, may be implemented as a dedicated or single device. In embodiments, the control unit 101, and especially the processor 102, may be implemented as distributed or multiple elements, and may especially at least in part be implemented in the measurement application device 104.

Figure 7:
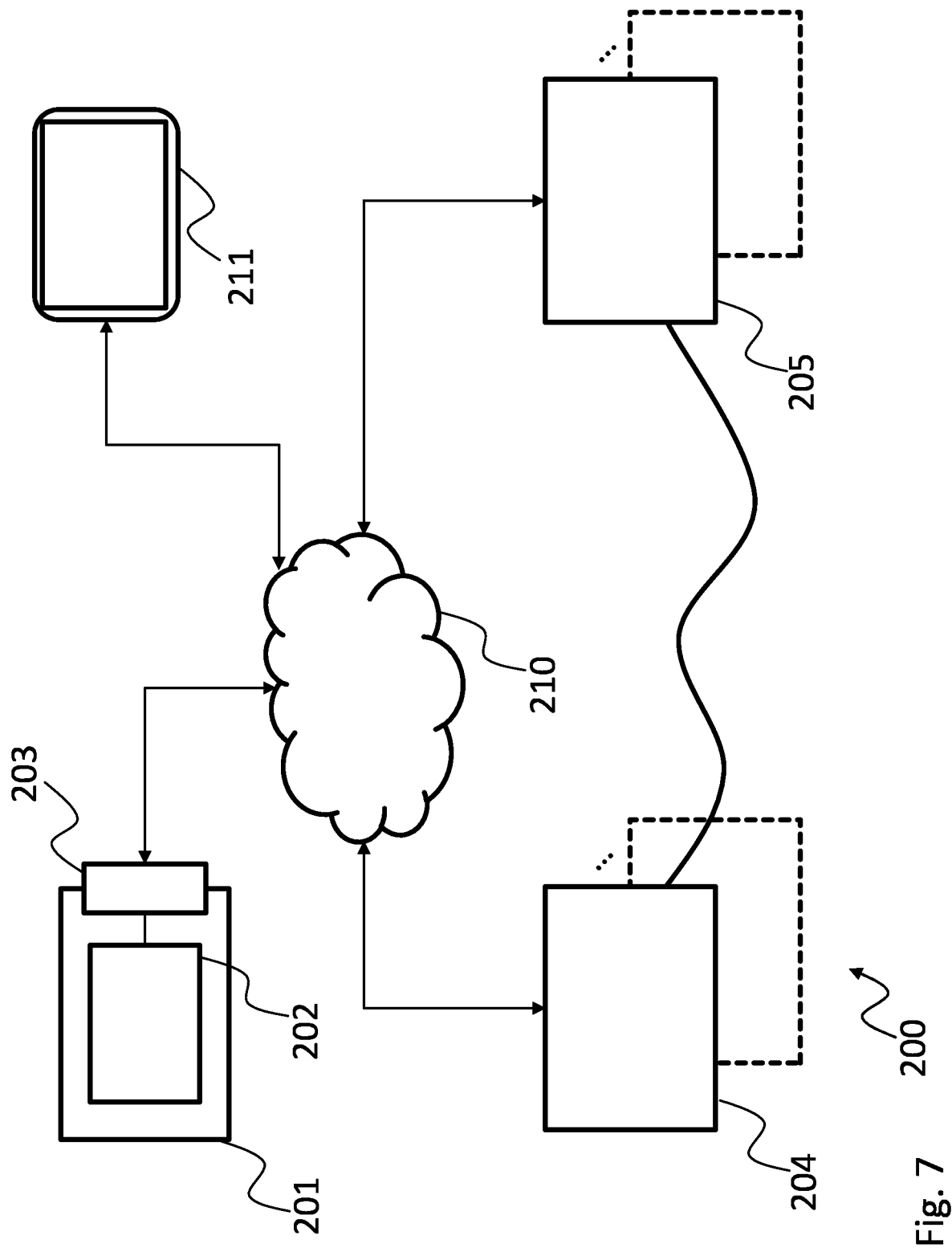
FIG. 7 shows a block diagram of a further measurement system according to the present disclosure.

FIG. 7 shows a block diagram of a measurement system 200. The measurement system 200 is based on the measurement system 100. Therefore, the measurement system 200 comprises a control unit 201 with a processor 202 that is coupled to a communication interface 203. The measurement system 200 further comprises a measurement application device 204, wherein more measurement application devices are hinted at by a dashed box. Further, the measurement system 200 comprises a device under test 205, wherein more devices under test are hinted at by a dashed box.

Instead of being directly coupled to the measurement application device 204 and the device under test 205, the control unit 201 is coupled to a network 210, which is coupled to the measurement application device 204 and the device under test 205. It is understood, that the connections between the elements of the measurement system 200 are just exemplary, and may be different in other embodiments.

Further, the measurement system 200 comprises a user device 211 that is also coupled to the network 210. The user device 211 may be used by a user to control the measurement system 200, instead of interacting with the control unit 201 or the measurement application device 204 directly. The user may, for example, program or input control commands via the user device 211 or select respective program files for execution.

It is understood, that the network 210 may be a local network at the premises of the user. Alternatively, the network 210 may at least in part comprise an external or public network, like the Internet. Further, the network 210 may comprise any type of network devices, like switches, hubs, routers, firewalls, and different types of network technologies.

Figure 8:
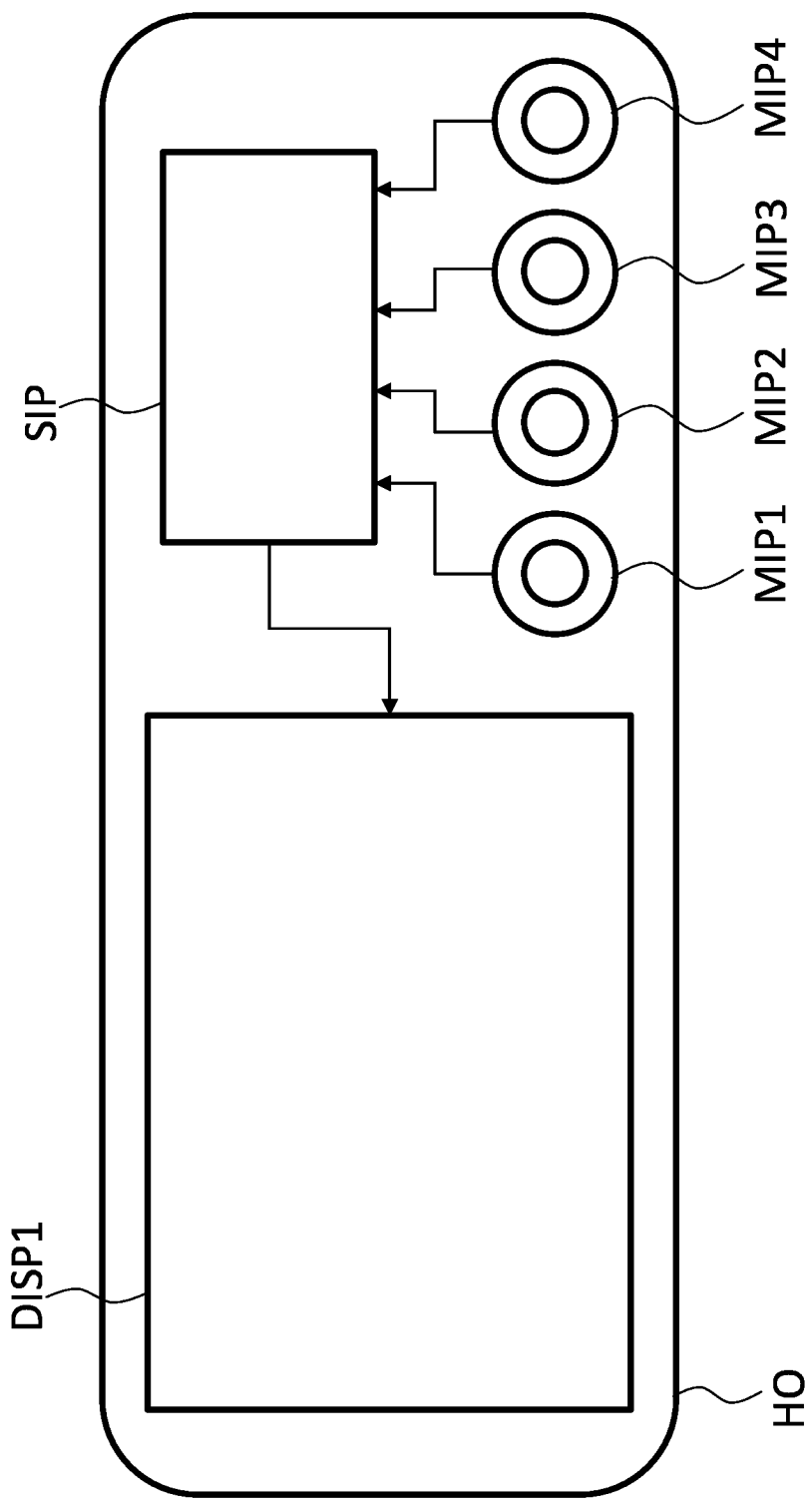
FIG. 8 shows a block diagram of a measurement application device according to the present disclosure.

FIG. 8 shows a block diagram of an oscilloscope OSC1 that may be used with an embodiment of a method according to the present disclosure.

The oscilloscope OSC1 comprises a housing HO that accommodates four measurement inputs MIP1, MIP2, MIP3, MIP4 that are coupled to a signal processor SIP for processing any measured signals. The signal processor SIP is coupled to a display DISP1 for displaying the measured signals to a user.

In embodiments, the oscilloscope OSC1 comprises a network interface for communicating with other elements of a measurement system. Further, the signal processor SIP may be configured to perform any embodiment of the method according to the present disclosure described above or below. The explanations provided above for the processor 102, 202 may, therefore, also apply to the signal processor SIP.

Although not explicitly shown, it is understood, that the oscilloscope OSC1 may also comprise signal outputs that may also be coupled to the differential measurement probe. Such signal outputs may for example serve to output calibration signals. Such calibration signals allow calibrating the measurement setup prior to performing any measurement. The process of calibrating and correcting any measurement signals based on the calibration may also be called de-embedding and may comprise applying respective algorithms on the measured signals.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

LIST OF REFERENCE SIGNS

S1, S2-1, S3-1, S4-1, S5-1, S2, S2-2 method steps
S3-2, S4-2, S5-2, S3, S2-3, S3-3 method steps
S4-3, S5-3, S2-4, S2-5, S3-6, S4-7 method steps
S4-8, S4-9, S4-10, S5-12, S5-13, S5-14 method steps
100, 200 measurement system
101, 201 control unit
102, 202 processor
103-1, 103-2, 203 communication interface
104, 204 measurement application device
105, 205 device under test
106 control command
107 command identifier
210 network
211 user device
OSC1 oscilloscope
HO housing
MIP1, MIP2, MIP3, MIP4 measurement input
SIP signal processing
DISP1 display

What is claimed is:

1. A method for accelerating remote control of a measurement application device, the method comprising:
receiving a control command for the measurement application device, the control command being received in a text-based format that uses a predetermined character encoding for encoding the command text;
mapping the received control command to a command identifier;
transmitting the command identifier to the measurement application device;
receiving the command identifier in the measurement application device;
reverse-mapping the command identifier to the respective control command in the measurement application device; and
executing the control command in the measurement application device.

2. The method according to claim 1, wherein the control command comprises a header and at least one parameter; and
wherein when transmitting the command identifier, the header is replaced by the command identifier, and the command identifier is transmitted together with the at least one parameter.

3. The method according to claim 2, wherein the at least one parameter is transmitted as character encoded parameter that is encoded with the same character encoding as the control command, or as binary encoded parameter.

4. The method according to claim 1, wherein mapping comprises querying a look-up table that comprises a unique command identifier for each one of all possible control commands.

5. The method according to claim 1, wherein mapping comprises calculating the command identifier based on a mathematical method, wherein the mathematical method is based on a hashing algorithm.

6. The method according to claim 1, wherein the command identifier comprises a numerical identifier; and
wherein transmitting comprises one of transmitting the command identifier as character encoded numerical identifier that is encoded with the same character encoding as the command text, or transmitting the command identifier as binary encoded command identifier.

7. The method according to claim 1, wherein transmitting further comprises transmitting a first information token to the measurement application device together with the command identifier, or prior to transmitting the command identifier, wherein the first information token indicates that the following control command is being transmitted as command identifier.

8. The method according to claim 1, wherein transmitting further comprises transmitting a second information token to the measurement application device prior to transmitting the command identifier, the second information token indicating that all following control commands are being transmitted as command identifiers.

9. The method according to claim 1, wherein transmitting further comprises:
transmitting a third information token to the measurement application device, the third information token indicating that the following control command is not transmitted as command identifier but as full control command; and
transmitting the received control command to the measurement application device instead of the command identifier.

10. The method according to claim 1, wherein for performing the mapping, all possible command identifiers are pre-calculated based on a list of possible control commands.

11. The method according to claim 1, wherein reverse-mapping comprises querying a look-up table that comprises a callback function for each one of all possible command identifiers; and
wherein executing comprises executing the respective callback function for the command identifier.

12. A measurement system comprising:
a control unit comprising a processor configured to:
receive a control command for the measurement application device, the control command being received in a text-based format that uses a predetermined character encoding for encoding the command text;
map the received control command to a command identifier; and
transmit the command identifier to the measurement application device; and
a measurement application device configured to
receive the command identifier;
reverse-map the command identifier to the respective control command in the measurement application device; and
execute the control command in the measurement application device,
wherein the control unit is communicatively coupled to the at least one measurement application device.

13. The measurement system according to claim 12, wherein the control command comprises a header and at least one parameter, and wherein in the method, when transmitting the command identifier, the header is replaced by the command identifier, and the command identifier is transmitted together with the at least one parameter.

14. The measurement system according to claim 13, wherein the at least one parameter is transmitted as character encoded parameter that is encoded with the same character encoding as the control command, or as binary encoded parameter.

15. The measurement system according to claim 12, wherein to map the received control command to a command identifier comprises to query a look-up table that comprises a unique command identifier for each one of all possible control commands.

16. The measurement system according to claim 12, wherein to map the received control command to a command identifier comprises to calculate the command identifier based on a mathematical method, wherein the mathematical method is based on a hashing algorithm.

17. The measurement system according to claim 12, wherein the command identifier comprises a numerical identifier; and
wherein to transmit the command identifier comprises one of to transmit the command identifier as character encoded numerical identifier that is encoded with the same character encoding as the command text, or to transmit the command identifier as binary encoded command identifier.

18. The measurement system according to claim 12, wherein to transmit the command identifier further comprises to transmit a first information token to the measurement application device together with the command identifier, or prior to transmitting the command identifier, wherein the first information token indicates that the following control command is being transmitted as command identifier.

19. The measurement system according to claim 12, wherein to transmit the command identifier further comprises to transmit a second information token to the measurement application device prior to transmitting the command identifier, the second information token indicating that all following control commands are being transmitted as command identifiers.

20. The measurement system according to claim 12, wherein to transmit the command identifier further comprises to:
transmit a third information token to the measurement application device, the third information token indicating that the following control command is not transmitted as command identifier but as full control command; and
transmit the received control command to the measurement application device instead of the command identifier.

21. The measurement system according to claim 12, wherein to perform the map of the received control command to the command identifier, all possible command identifiers are pre-calculated based on a list of possible control commands.

22. The measurement system according to claim 12, wherein to reverse-map comprises to query a look-up table that comprises a callback function for each one of all possible command identifiers; and wherein to execute the command comprises executing the respective callback function for the command identifier.

* * * * *